(Model.)

D. H. ALLEN & M. LOREE.
LOCK NUT.

No. 397,103. Patented Feb. 5, 1889.

Attest:
Geo. T. Smallwood.
Clement Smallwood

Inventors,
David H. Allen
Manfred Loree.
By A. H. Smith & Son, atty's

UNITED STATES PATENT OFFICE.

DAVID H. ALLEN AND MANFRED LOREE, OF MIAMISBURG, OHIO.

LOCK-NUT.

SPECIFICATION forming part of Letters Patent No. 397,103, dated February 5, 1889.

Application filed May 9, 1888. Serial No. 273,283. (Model.)

*To all whom it may concern:*

Be it known that we, DAVID H. ALLEN and MANFRED LOREE, both of Miamisburg, county of Montgomery, and State of Ohio, have invented a new and useful Improvement in Lock-Nuts, of which the following is a full, clear, and exact description, reference being had to the accompanying drawings, making part of this specification.

Our invention relates to an improvement in the construction of lock-nuts, whereby they are adapted to lock and hold themselves in any position to which they may be adjusted upon the bolt without the aid of supplementary or extraneous locking devices; and it consists in forming upon the outer face of the nut a projecting arm threaded at its outer end upon the inner face to engage the bolt, and bent inwardly toward the bolt, so as to be crowded outwardly by said bolt, thereby causing it to grasp and hold the bolt tightly, or to cramp the nut upon the bolt, and so prevent its accidental movement thereon, as hereinafter described and claimed.

Figure 1:
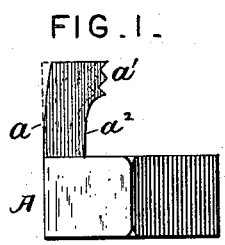
Figure 2:
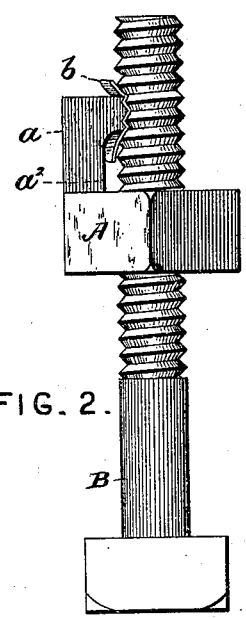
Figure 3:
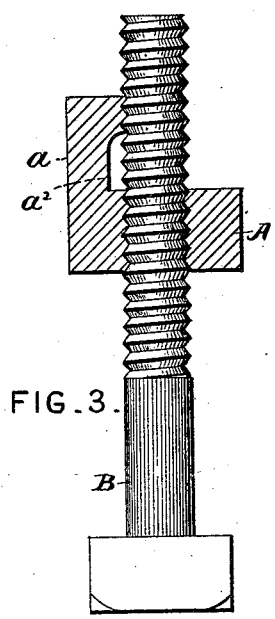
Figure 4:
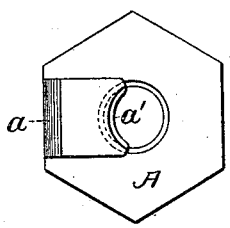

In the accompanying drawings, Figure 1 represents our improved nut in side elevation. Fig. 2 is a side elevation showing the nut applied to the bolt; and Fig. 3 is a similar view of the bolt, showing the nut in section. Fig. 4 is a plan or outer face view of the nut.

A indicates the nut, and B the bolt, the latter being of any usual form or construction. The nut A has a projecting arm, $a$, upon its outer face, which is formed in one piece with the body of the nut and of a thickness corresponding to the radial thickness of the annulus or body of the nut, so that in cutting the thread in the nut said thread will also be formed or cut in the inner face of said arm, as shown at $a'$, after which the inner face of the inner end of said arm adjacent to the body of the nut is milled or cut away, as shown at $a^2$, removing the screw-threads, or otherwise so formed at said portion as to make the arm sufficiently thin at that point to give it a slight degree of elasticity and to remove said inner end from actual contact with the bolt. The arm is then bent inward toward the axial center of the nut from the position shown in dotted lines to that shown in full lines, and is then ready for use.

In forcing the nut upon the bolt the arm $a$ yields outwardly, necessarily, to permit its threaded end to engage the bolt, and in so doing is brought back to or near its original position or parallel relation to the axis of the nut or bolt, and so is made to exert its elasticity to resist the movement of and to cant the body of the nut on the bolt, and so to cause it to cramp or bind upon said bolt, and thereby to lock and hold it against accidental movement.

The arm $a$ may of course be made of any desired length and elasticity, according to the use to which it is to be applied, and where from use its elasticity has become in any way impaired or weakened, it may be supplemented by the interposition of a strip or piece of sheet metal between its threaded end and the bolt, and which in the passage of the nut over the bolt will be crimped or screw-threaded by the action of the arm and bolt upon it, as indicated at $b$, Fig. 2.

Having now described our invention, we claim as new—

1. A nut provided on its outer face with a projecting screw-threaded and inwardly-deflected arm for engaging the bolt and holding the nut thereon, substantially as described.

2. A nut provided on its outer face with an outwardly-projecting yielding arm, threaded on its inner face at its outer end to engage the bolt and lock the nut in position thereon, substantially as described.

3. The combination, with a bolt, of a nut having on its outer face an outwardly-projecting yielding arm, screw-threaded at its outer end on its inner face to engage the bolt, and the interposed sheet-metal strip or plate, for the purpose and substantially as described.

In testimony whereof we have hereunto set our hands.

DAVID H. ALLEN.
MANFRED LOREE.

Witnesses to signature of D. H. Allen:
W. P. BELL,
ROBERT M. BELL.

Witnesses to signature of M. Loree:
ARTHUR H. WEAVER,
W. H. GAMBLE.